United States Patent
Itogawa et al.

(10) Patent No.: US 8,914,852 B2
(45) Date of Patent: Dec. 16, 2014

(54) SYSTEMS, APPARATUS, AND COMPUTER-READABLE STORAGE MEDIUM FOR RECORDING IMAGES ON A RECORDING MEDIUM

(75) Inventors: Yoshihiro Itogawa, Mizuho (JP); Noriaki Kishimoto, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 71 days.

(21) Appl. No.: 13/432,701

(22) Filed: Mar. 28, 2012

(65) Prior Publication Data
US 2013/0086638 A1 Apr. 4, 2013

(30) Foreign Application Priority Data
Sep. 30, 2011 (JP) .................. 2011-218752

(51) Int. Cl.
| | |
|---|---|
| *G06F 21/00* | (2013.01) |
| *H04L 29/06* | (2006.01) |
| *G06F 21/34* | (2013.01) |
| *G06F 21/60* | (2013.01) |

(52) U.S. Cl.
CPC ............... *H04L 63/08* (2013.01); *G06F 21/34* (2013.01); *G06F 21/608* (2013.01)
USPC ................................................. 726/4; 726/7

(58) Field of Classification Search
CPC ....... G06F 21/34; G06F 21/00; G06F 21/608; H04L 63/08
USPC ........................................................... 726/4, 7
See application file for complete search history.

(56) References Cited

U.S. PATENT DOCUMENTS

| | | | | |
|---|---|---|---|---|
| 2005/0253889 | A1* | 11/2005 | Shozaki et al. | 347/19 |
| 2006/0158670 | A1* | 7/2006 | Park | 358/1.9 |
| 2007/0171436 | A1* | 7/2007 | Manchester | 358/1.1 |
| 2011/0063667 | A1* | 3/2011 | Nishida | 358/1.15 |

FOREIGN PATENT DOCUMENTS

JP 2003-094777 A 4/2003

* cited by examiner

*Primary Examiner* — Peter Shaw
(74) *Attorney, Agent, or Firm* — Baker Botts L.L.P.

(57) ABSTRACT

When authentication information is input via an IC card reader and includes predetermined information. A portable terminal corresponding to the authentication information is identified, and specific identification information that identifies an image-data file associated with the authentication information is extracted. The extracted specific identification information is transmitted to the identified portable terminal, and the portable terminal displays a list of the received specific identification information on its touch panel. The operation of a printing mechanism is controlled, so that the image-data file corresponding to the specific identification information that selected with a touch panel on the portable terminal is accessed, and an image defined by the image-data file defines is printed on a sheet.

11 Claims, 7 Drawing Sheets

SYSTEMS, APPARATUS, AND COMPUTER-READABLE STORAGE MEDIUM FOR RECORDING IMAGES ON A RECORDING MEDIUM

CROSS REFERENCE TO RELATED APPLICATION

This application claims priority from Japanese Patent Application No. 2011-218752, filed on Sep. 30, 2011, which is incorporated herein by reference.

BACKGROUND OF THE INVENTION

1. Field of the Invention

The present invention relates generally to systems, apparatus, and computer-readable storage medium for recording an image on a recording medium.

2. Description of Related Art

Known printing systems allow a plurality of users to share a printer by wire or wirelessly. in a known technique to improve the security of printing in such printing systems, a user may transmit the image data for an image to be printed to a printer from a terminal, and printing (i.e., secure printing) is performed only after an authentication procedure has been performed using an operation panel of the printer. Nevertheless, when a user transmits authentication information to a printer, a list of printable data files is displayed on the operation panel of the printer. At that time, another user may view certain identification information that the transmitting user would like to keep secret, such as the names of the data files, thereby revealing that secret information to the other user.

SUMMARY OF THE INVENTION

To address at least the foregoing problems, the systems, apparatus, and computer-readable storage medium disclosed herein may prevent identification information for an image that is to be recorded by secure printing from being viewed by another user.

In one embodiment, the image recording system disclosed herein may comprise an image recording apparatus and a portable terminal configured to perform data communication with the image recording apparatus. The image recording apparatus may comprise a memory configured to store an image-data file associated with authentication information; a recording unit configured to record an image defined by the image-data file on a recording medium; a display; a display controller configured to control the display; an input interface configured to receive input of the authentication information; an authentication determination unit configured to determine whether the authentication information comprises predetermined information that corresponds to the portable terminal; a portable-terminal identifying unit configured to identify the portable terminal that corresponds to the authentication information, when the authentication determination unit determines that the authentication information input to the input interface comprises the predetermined information; an apparatus-side interface configured to perform data communication with the portable terminal identified by the portable-terminal identifying unit; and an apparatus-side communication controller configured to cause the apparatus-side interface to transmit specific identification information to the portable terminal identified by the portable-terminal identifying unit, the specific identification information comprising identification information for the image-data file associated with the authentication information that is determined by the authentication determination unit to comprise the predetermined information. The portable terminal may comprise a terminal-side display, a terminal-side interface configured to perform data communication with the image recording apparatus, and a terminal-side display controller configured to cause the terminal-side display to display the specific identification information, when the terminal-side interface receives the specific identification information.

In another embodiment, the image recording system disclosed herein may comprise an image recording apparatus, a server configured to perform data communication with the image recording apparatus, and a portable terminal configured to perform data communication with the image recording apparatus. The image recording apparatus may comprise a memory configured to store an image-data file associated with authentication information, a recording unit configured to record an image defined by the image-data file on a recording medium, a display, a display controller configured to control the display, an input interface configured to receive input of the authentication information, a portable-terminal identifying unit configured to identify the portable terminal that corresponds to the authentication information input to the input interface, an apparatus-side interface configured to perform data communication with one or more of the server and the portable terminal, and an apparatus-side communication controller configured to control the apparatus-side interface. The server may comprise an authentication determination unit configured to determine whether the authentication information comprises predetermined information, a server-side interface configured to perform data communication with the image recording apparatus, and a server-side communication controller configured to control the server-side interface. The portable terminal may comprise a terminal-side display, a terminal-side-display controller configured to control display of the terminal-side display, a terminal-side interface configured to perform data communication with the image recording apparatus, and a terminal-side communication controller configured to control the terminal-side interface. Further, the apparatus-side communication controller may be configured to cause the apparatus-side interface to transmit the authentication information input to the input interface to the server. In addition, when the authentication determination unit determines that the authentication information received by the server-side interface unit comprises the predetermined information, the server-side communication controller may cause the server-side interface to transmit the determination result to the image recording apparatus. In addition, when the determination result is received by the apparatus-side interface, the portable-terminal identifying unit may identify the portable terminal corresponding to the authentication information and the apparatus-side communication controller causes the apparatus-side interface to transmit specific identification information to the portable terminal identified by the portable-terminal identifying unit. Moreover, the specific identification information may be identification information of the image-data file associated with the authentication information that is determined to comprise the predetermined information, and the terminal-side display controller may be configured to cause the terminal-side display to display the specific identification information, when the terminal-side interface receives the specific identification information.

In still another embodiment, the image recording system disclosed herein may comprise an image recording apparatus, a server configured to perform data communication with the image recording apparatus, and a portable terminal configured to perform data communication with the server. The image recording apparatus may comprise a recording unit configured to record an image on a recording medium, a display, a display controller configured to control display of the display, an input interface configured to receive input of authentication information, an apparatus-side interface configured to perform data communication with the server, and an apparatus-side communication controller configured to control the apparatus-side interface. The server may comprise a memory configured to store an image-data file associated with the authentication information; an authentication determination unit configured to determine whether the authentication information comprises predetermined information; a portable-terminal identifying unit configured to identify the portable terminal that corresponds to the authentication information, when the authentication determination unit determines that the authentication information comprises the predetermined information; a server-side interface configured to perform data communication with one or more of the image recording apparatus and the portable terminal; and a server-side communication controller configured to control the server-side interface. The portable terminal may comprise a terminal-side display, a terminal-side display controller configured to the terminal-side display, a terminal-side interface configured to perform data communication with the server, and a terminal-side communication controller configured to control the terminal-side interface. Further, the apparatus-side communication controller may be configured to cause the apparatus-side interface to transmit the authentication information input to the input interface to the server. In addition, when it is determined by the authentication determination unit that the authentication information received by the server-side interface comprises the predetermined information, the server-side communication controller may cause the server-side interface to transmit specific identification information to the portable terminal identified by the portable-terminal identifying unit. Moreover, the specific identification information may be identification information for the image-data file associated with the authentication information that is determined to comprise the predetermined information, and the terminal-side-display controller may be configured to cause the terminal-side display to display the specific identification information, when the terminal-side interface receives the specific identification information.

In yet another embodiment, the computer-readable storage medium disclosed herein may store a program for use in an image recording system that comprises an image recording apparatus and a portable terminal configured to perform data communication with the image recording apparatus. The image recording apparatus may comprise a memory configured to store an image-data file associated with authentication information, a recording unit configured to record an image defined by the image-data file on a recording medium, a display, an input interface configured to receive input of the authentication information, and an apparatus-side interface configured to perform data communication with the portable terminal. The portable terminal may comprise a terminal-side display and a terminal-side interface configured to perform data communication with the image recording apparatus. Further, The program may be configured to cause the image recording apparatus to function as a display controller configured to control the display; an authentication determination unit configured to determine whether the authentication information comprises predetermined information; a portable-terminal identifying unit configured to identify the portable terminal that corresponds to the authentication information, when the authentication determination unit determines that the authentication information input to the input interface comprises the predetermined information; and an apparatus-side communication controller configured to cause the apparatus-side interface to transmit specific identification information to the portable terminal identified by the portable-terminal identifying unit. In addition, the specific identification information may be identification information of the image-data file associated with the authentication information that is determined by the authentication determination unit to comprise the predetermined information, and the program may be further configured to cause the portable terminal to function as a terminal-side display controller configured to cause the terminal-side display to display the specific identification information, when the terminal-side interface receives the specific identification information.

In a further embodiment, the computer-readable storage medium disclosed herein may store a program for use in an image recording apparatus of an image recording system that includes the image recording apparatus and a portable terminal configured to perform data communication with the image recording apparatus. The image recording apparatus may comprise a memory configured to store an image-data file associated with authentication information, a recording unit configured to record an image defined by the image-data file on a recording medium, a display, an input interface configured to receive input of the authentication information, and an interface configured to perform data communication with the portable terminal. The portable terminal may comprise a terminal-side display; a terminal-side interface configured to perform data communication with the image recording apparatus; and a terminal-side display controller configured to cause the terminal-side display to display specific identification information, when the terminal-side interface receives the specific identification information. Further, the program may be configured to cause the image recording apparatus to function as a display controller configured to control the display; an authentication determination unit configured to determine whether the authentication information comprises predetermined information; a portable-terminal identifying unit configured to identify the portable terminal that corresponds to the authentication information, when the authentication determination unit determines that the authentication information input to the input interface comprises the predetermined information; and a communication controller configured to cause the interface to transmit the specific identification information to the portable terminal identified by the portable-terminal identifying unit. In addition, the specific identification information may identification information of the image-data file associated with the authentication information that is determined by the authentication determination unit to comprise the predetermined information.

In still a further embodiment, the computer-readable storage medium disclosed herein may store a program for use in a portable terminal of an image recording system that comprises the portable terminal and an image recording apparatus configured to perform data communication with the portable terminal. The image recording apparatus may comprise a storage configured to store an image-data file associated with authentication information; a recording unit configured to record an image defined by the image-data file on a recording medium; an apparatus-side display; an apparatus-side display controller configured to control display of the apparatus-side display; an input interface configured to receive input of the authentication information; an authentication determination unit configured to determine whether the authentication information comprises predetermined information; a portable-terminal identifying unit configured to identify the portable terminal that corresponds to the authentication information, when the authentication determination unit determines that the authentication information input to the input interface comprises the predetermined information; an apparatus-side interface configured to perform data communication with the portable terminal; and an apparatus-side communication controller configured to cause the apparatus-side interface to transmit specific identification information to the portable terminal identified by the portable-terminal identifying unit, the specific identification information being identification information of the image-data file associated with the authentication information that is determined by the authentication determination unit to comprise the predetermined information. The portable terminal may comprise a display and an interface configured to perform data communication with the image recording apparatus. Further, the program may be configured to cause the portable terminal to function as a display controller and to cause the display to display the specific identification information, when the terminal-side interface receives the specific identification information.

In yet a further embodiment, the image recording apparatus disclosed herein may be configured to perform data communication with a portable terminal. The image recording apparatus may comprise a memory configured to store an image-data, file associated with authentication information; a recording unit configured to record an image defined by the image-data file on a recording medium; a display; a display controller configured to control the display; an input interface configured to receive input of the authentication information; an authentication determination unit configured to determine whether the authentication information comprises predetermined information; a portable-terminal identifying unit configured to identify the portable terminal that corresponds to the authentication information, when the authentication determination unit determines that the authentication information input to the input interface comprises the predetermined information; an interface configured to perform data communication with the portable terminal; and a communication controller configured to cause the interface to transmit specific identification information to the portable terminal identified by the portable-terminal identifying unit. Further, the specific identification information may identification information of the image-data file associated with the authentication information that is determined by the authentication determination unit to comprise the predetermined information.

In another embodiment, the image recording apparatus disclosed herein may comprise an image recording apparatus and a portable terminal configured to perform data communication with the image recording apparatus. The image recording apparatus may comprise a memory configured to store an image-data file associated with authentication information, a recording unit configured to record an image defined by the image-data file on a recording medium, a display, an input interface configured to receive input of the authentication information, an apparatus-side interface configured to perform data communication with the portable terminal, and an apparatus-side controller. The apparatus-side controller may be configured to determine whether the authentication information comprises predetermined information; identify the portable terminal that corresponds to the authentication information, when the apparatus-side controller determines that the authentication information input to the input interface comprises the predetermined information; and cause the apparatus-side interface to transmit specific identification information to the portable terminal identified. Further, the specific identification information may identification information of the image-data file associated with the authentication information that is determined to comprise the predetermined information. In addition, the portable terminal may comprise a terminal-side display; a terminal-side interface configured to perform data communication with the image recording apparatus; and a terminal-side controller configured to cause the terminal-side display to display the specific identification information, when the terminal-side interface receives the specific identification information.

In another embodiment, the image recording apparatus disclosed herein may be configured to perform data communication with a portable terminal. The image recording apparatus may comprise a memory configured to store an image-data file associated with authentication information, a recording unit configured to record an image defined by the image-data file on a recording medium, a display; an input interface configured to receive input of the authentication information, an interface configured to perform data communication with the portable terminal, and a controller configured. The controller may be configured to determine whether the authentication information comprises predetermined information; identify the portable terminal corresponding to the authentication information, when the controller determines that the authentication information input to the input interface comprises the predetermined information; and cause the interface to transmit specific identification information to the portable terminal identified. Further, the specific identification information may be identification information of the image-data file associated with the authentication information that is determined to comprise the predetermined information.

Because the identification information of an image-data file associated with authentication information may be displayed only on the terminal-side display unit of the portable terminal in the systems, apparatus, and computer-readable storage medium disclosed herein, another user may be prevented from viewing the identification information. Other objects, features, and advantages of the invention will be apparent to persons of ordinary skill in the art from the following detailed description of the invention and the accompanying drawings.

BRIEF DESCRIPTION OF THE DRAWINGS

For a more complete understanding of the invention, needs satisfied thereby, and the objects, features, and advantages thereof, reference now is made to the following descriptions taken in connection with the accompanying drawings.

DETAILED DESCRIPTION OF EMBODIMENTS OF THE INVENTION

Embodiments of the invention now are described in detail with reference to the accompanying drawings, wherein like reference numerals are used for like corresponding parts in the various drawings.

1. Embodiment of FIGS. 1-3

Figure 1:
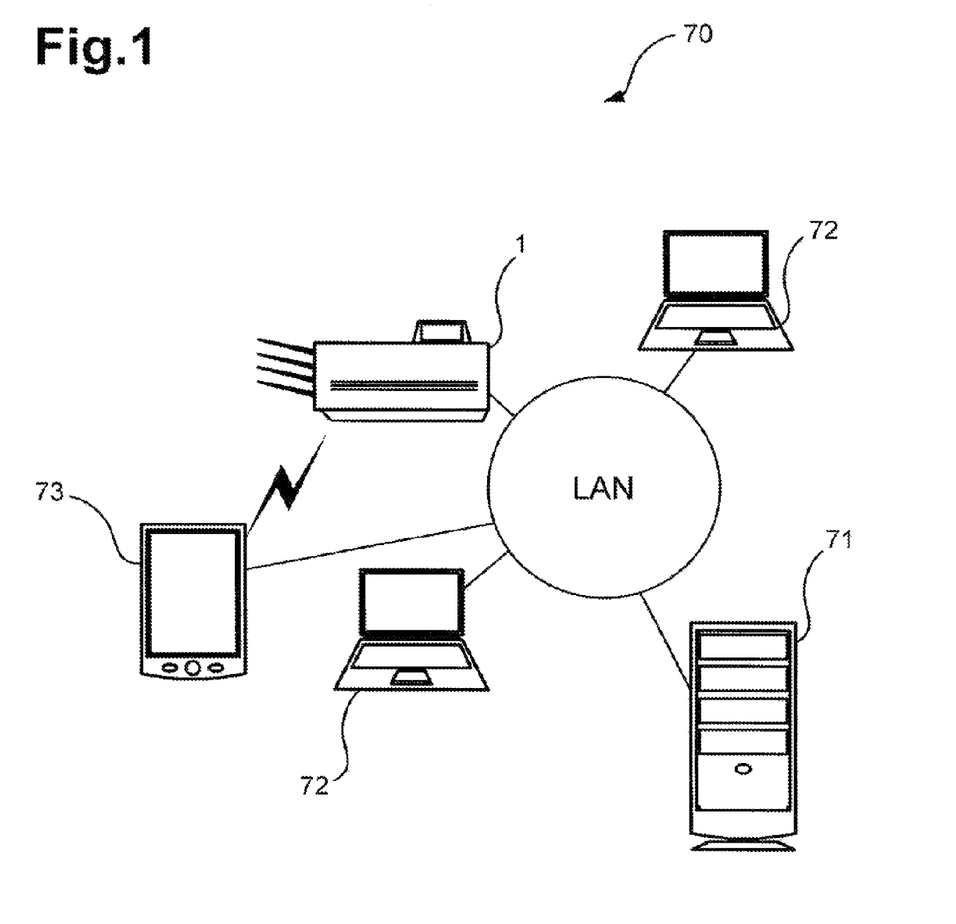
FIG. 1 is a schematic diagram of a printing system according to an embodiment of the invention.

As depicted in FIG. 1, a printing system 70 may comprise a server 71, a printer 1, one or more personal computers ("PCs") 72, and one or more portable terminals 73, which may communicate wirelessly with one another via a wireless local area network ("LAN"). Printer 1 may be operated via PC 72.

Figure 2:
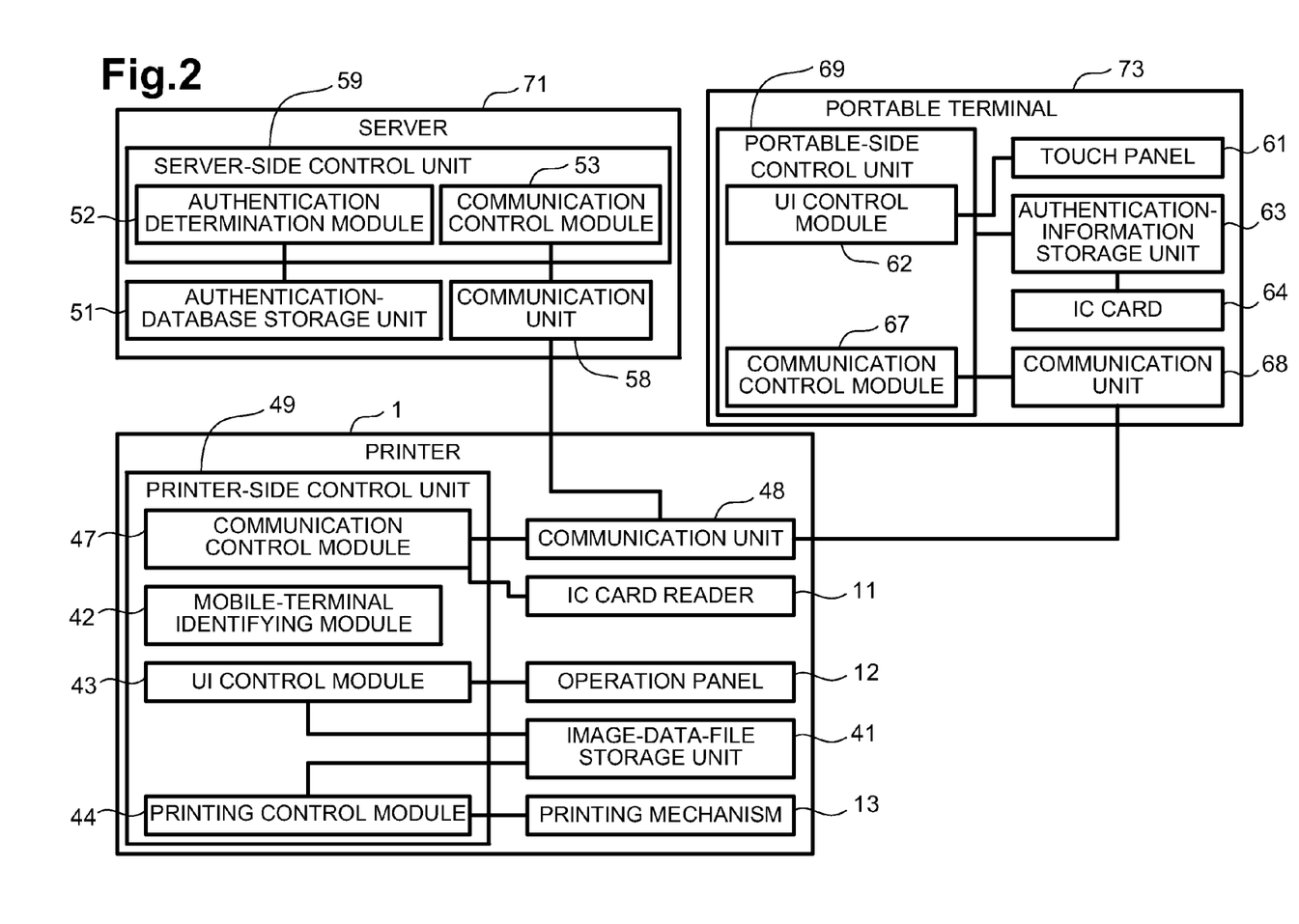
FIG. 2 is a functional, block diagram of the printing system of FIG. 1.

As depicted in FIG. 2, server 71 may comprise a server-side control unit 59 (e.g., a server-side controller), an authentication-database storage unit 51 (e.g., part of a portable-terminal identifying unit), and a communication unit 58 (e.g., a server-side interface). Server-side control unit 59 may comprise one or more computers. Although not depicted in FIG. 2, each of the computers may comprise a central processing unit ("CPU"), an electrically erasable and programmable read-only memory ("EEPROM") that may store the programs that the CPU may execute and the data that may be used in the programs, a random access memory ("RAM"), in which the CPU temporarily may store data during the execution of the programs, an interface that may be configured to connect the CPU with an external device, and an internal path that may provide the connection between the CPU and the external device. The programs, which the CPU may execute, may be stored in various types of storage medium, such as a flexible disk, a CD-ROM, and a memory card, from which the programs may be installed into the EEPROM. When the programs are executed by the CPU, the functions of the server-side control unit 59 may be implemented.

Server-side control unit 59 may comprise an authentication determination module 52 (e.g., an authentication determination unit) and a communication control module 53 (e.g., a server-side communication controller), as modules for executing those functions. Authentication-database storage unit 51 may store a database, in which authentication information for individual users and portable terminals 73, may be associated with each other. Communication unit 58 may transmit to and receive information from printer 1 under the control of communication control module 53 of server-side control unit 59. A communication unit 58A may comprise a known communication interface that may be configured to provide external output. Authentication determination module 52 may determine whether authentication information received from printer 1 comprises predetermined information by referencing the database stored in authentication-database storage unit 51. Communication control module 53 may transmit the determination result to printer 1 via communication unit 58. The predetermined information may be stored in authentication determination module 52 or, alternatively, authentication information relating to the individual users, which may be stored in authentication-database storage unit 51, may be used as the predetermined information to determine whether the predetermined information matches the authentication information received from printer 1. In addition, server-side control unit 59 may comprise an Application Specific Integrated Circuit ("ASIC") or a Field-Programmable Gate Array ("FPGA").

As depicted in FIG. 2, portable terminal 73 may comprise a portable-side control unit 69 (e.g., a portable-side controller), a touch panel 61 (e.g., a terminal-side display), an authentication-information storage unit 63, an integrated circuit ("IC") card 64, and a communication unit 68 (e.g., a terminal-side interface). Portable-side control unit 69 may comprise one or more computers. Although not depicted in FIG. 2, each the computers may comprise a CPU, an EEPROM that may store programs that the CPU may execute and data that may be used in the programs, a RAM, in which the CPU temporarily may store data during the execution of the programs, an interface that may be configured to connect the CPU with an external device, and an internal path that may provide the connection between the CPU and the external device. The programs that the CPU may execute may be stored in various types of storage medium, such as a flexible disk, a CD-ROM, and a memory card, from which the programs may be installed into the EEPROM. When the programs are executed by the CPU, the functions of portable-side control unit 69 may be implemented.

Portable-side control unit 69 may comprise a user interface ("UI") control module 62 (e.g., a terminal-side display controller) and a communication control module 67 (e.g., a terminal-side communication controller), as modules for executing those functions. Touch panel 61 may serve both as a display unit and an input device for portable terminal 73. Authentication-information storage unit 63 may store authentication information relating to the user of a particular portable terminal 73. IC card 64 may be a noncontact IC card, with which the authentication information stored in authentication-information storage unit 63, may be read via wireless data communication using a standard communication protocol (e.g., communication using electromagnetic induction). IC card 64 may be a chip-type card and may be installed in portable terminal 73. Communication unit 68 may transmit and receive information to and from printer 1 under the control of communication control module 67 of portable-side control unit 69. A communication unit 68A may comprise a known communication interface that may be configured to provide external output. In addition, portable-side control unit 69 may comprise an ASIC or an FPGA.

UI control module 62 may control touch panel 61. UI control module 62 may cause touch panel 61 to display a list of specific identification information (described below) that may comprise identification information for a plurality of image-data files transmitted from printer 1 and received by communication unit 68 via the wireless LAN. UI control module 62 may recognize specific identification information that may be selected from the specific identification information displayed on touch panel 61. That specific identification information may be transmitted to printer 1 by communication unit 68 via the wireless LAN under the control of communication control module 67. UI control module 62 may cause touch panel 61 not to display identification information that is not the specific identification information (e.g., public-level identification information, as described below). UI control module 62 may be configured to allow a preview screen for previewing the details of printing for part or all of the specific identification information that may be displayed on touch panel 61.

As also depicted in FIG. 2, printer 1 may comprise a printer-side control unit 49 (e.g., a printer-side controller), an IC card reader 11 (e.g., an input interface), which may be configured to perform user authentication, an operation panel 12 (e.g., a display), a printing mechanism 13 a recording unit), an image-data-file storage unit 41 storage), and a communication unit 48 (e.g., an apparatus-side communication interface). Printer-side control unit 49 may comprise one or more computers. Although not depicted in FIG. 2, each of the computers may comprise a CPU, an EEPROM that may store programs that the CPU may execute and data that may be used in the programs, a RAM, in which the CPU temporarily may store data during the execution of the programs, an interface that may be configured to connect the CPU with an external device, and an internal path that may provide the connection between the CPU and the external device. The programs, which the CPU may execute, may stored in various types of storage medium, such as a flexible disk, a CD-ROM, and a memory card, from which the programs may be installed into the EEPROM. When the programs are executed by the CPU, the functions of printer-side control unit 49 may be implemented.

Printer-side control unit 49 may comprise a mobile-terminal identifying module 42, a UI control module 43 (e.g., a display controller), a printing control module 44, and a communication control module 47 (e.g., an apparatus-side communication controller and an apparatus-side communication controller), as modules for executing those functions. In addition, printer-side control unit 49 may comprise an ASIC or an FPGA.

IC card reader 11 may be a noncontact device that automatically retrieves authentication information for the user of portable terminal 73 via wireless communication with IC card 64 in portable terminal 73, when the portable terminal 73 is disposed proximate to IC card reader The authentication information input to IC card reader 11 may be transmitted to server 71 by communication unit 48 under the control of communication control module 47 of printer-side control unit 49. Operation panel 12 may comprise a display unit (e.g., a display) and input devices (e.g., a display-permission input unit and a user-authentication input unit) for printer 1. The authentication information may be input manually via operation panel 12. Printing mechanism 13 may print an image on a sheet in accordance with a print command received from PC 72 or input received via operation panel 12.

Image-data-file storage unit 41 may store image-data files that may comprise data necessary for printing with printer 1. The image-data files may comprise data stored in advance and data received from PC 72 or server 71. Security levels may be set for the individual image-data files. The security levels may comprise a public level for image-data files that all users are authorized to see and a private level for image-data files that only a specific user is authorized to see. For example, image-data files at the public level may not be associated with specific authentication information, and all image-data files at the private level may be associated with authentication information corresponding to the individual users. Image-data-file storage unit 41 also may store a database, in which image-data files, and authentication information may be associated with each other.

Communication unit 48 may transmit to and receive information from server 71 and portable terminal 73 under the control of communication control module 47 of printer-side control unit 49. Communication unit 48 may comprise a known communication interface that may be configured to provide external output.

Mobile-terminal identifying module 42 may identify a particular portable terminal 73 of a particular user that corresponds to authentication information input to IC card reader 11. For example, authentication information input to IC card reader 11 may be transmitted to server 71 by communication control module 47 via communication unit 48, and authentication determination module 52 of server 71 may determine whether the authentication information received by communication unit 58 comprises predetermined information (e.g., whether authentication information matches authentication information stored in authentication-database storage unit 51). When the authentication information comprises the predetermined information, information on portable terminal 73 associated with the authentication information, and the determination result may be transmitted to printer 1 by communication control module 53 via communication unit 58. When the information on portable terminal 73 and the determination result are received by communication unit 48 of printer 1, mobile-terminal identifying module 42 may identify a particular portable terminal 73 of a particular user that corresponds to the authentication information input to IC card reader as the portable terminal 73 that corresponds to the received a authentication information.

UI control module 43 may control operation panel 12. When the information on portable terminal 73 and the determination result transmitted from communication control module 53 to printer 1 via communication unit 58 are received by communication unit 48 of printer 1, UI control module 43 may extract specific identification information from that information. The specific identification information extracted from the information on portable terminal 73 and the determination result transmitted from communication control module 53 may comprise the identification information (e.g., a file name) of an image-data file at the private level that is associated with the authentication information for an image-data file among the image-data files stored in image-data-file storage unit 41, with reference to the database in image-data-file storage unit 41. That extracted specific identification information may be transmitted by communication control module 47 to the particular portable terminal 73 specified by the mobile-terminal identifying module 42, as described above, via communication unit 48. In that particular portable terminal 73, the extracted specific identification information may be displayed on touch panel 61 by UI control module 62. At that time, UI control module 43 of printer-side control unit 49 may cause operation panel 12 to display an indication that the extracted specific identification information is being displayed on touch panel 61 of portable terminal 73.

When mobile-terminal identifying module 42 does not identify a particular portable terminal 73 (e.g., when the information stored in authentication-database storage unit 51 does not comprise the information on portable terminal 73 associated with the authentication information), UI control module 43 may cause operation panel 12 to display an indication that a particular portable terminal 73 was not identified. At that time, UI control module 43 may cause operation panel 12 to further display a selection screen that prompts a user to provide input that indicates the user's permission to display the extracted specific identification information on operation panel 12. When the input indicates permission to display the extracted specific identification information, UI control module 43 may cause operation panel 12 to display the extracted specific identification information at Step S110.

When authentication information is input not to IC card reader 11, but, instead, to operation panel 12, UI control module 43 may cause operation panel 12 to display the extracted specific identification information. UI control module 43 may cause operation panel 12 to display the identification information of image-data files at the public level among the image-data files stored in image-data-file storage unit 41, regardless of whether the input indicates permission to display the extracted specific identification information and regardless of whether the authentication information is input to IC card reader 11 or operation panel 12.

Printing control module 44 may control the operation of printing mechanism 13 on the basis of a print command.

Examples of the print command may comprise a command for secure printing and a command for normal printing. When a print command for secure printing is received, printer 1 may not start printing according to the print command until authentication information of an image-data file to be printed is selected using portable terminal 73 or operation panel 12. In contrast, when a print command for normal printing is received, printing control module 44 may control the operation of printing mechanism 13, so that printer 1 may start printing according to the print command without requiring the selection of authentication information. Thus, there is a greater level of security in a secure printing operation than a normal printing operation because a secure print command allows monitoring of the printing operation by requiring the selection of the authentication information of an image-data file to be printed before printer 1 may start printing.

Figure 3:
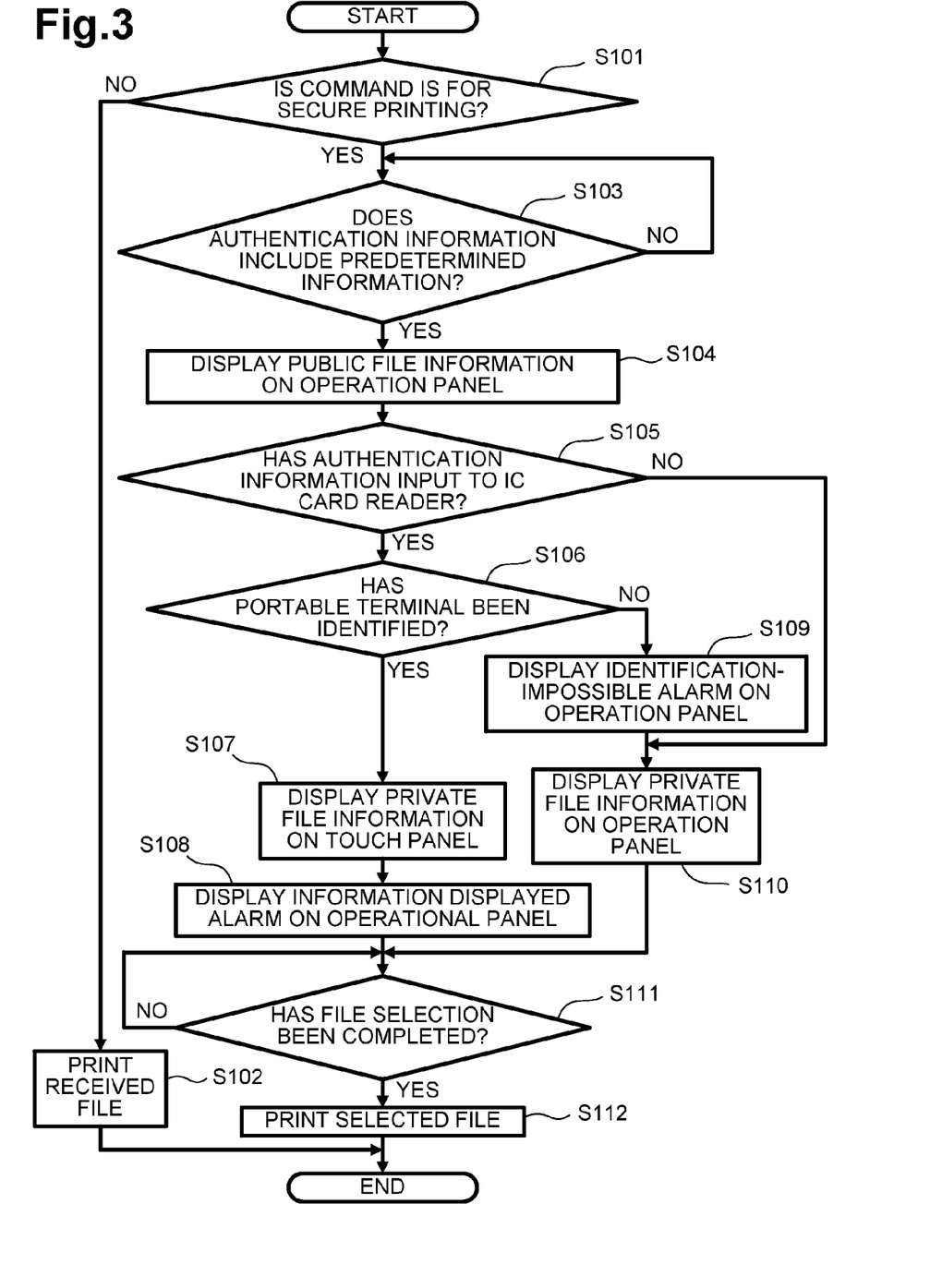
FIG. 3 is a flowchart depicting the operation of the printing system of FIG. 1.

An example of a printing operation of printing system 70 is described with respect to FIG. 3. As depicted in FIG. 3, when a print command is transmitted from PC 72 or from portable terminal 73 to printer 1, communication unit 48 may receive the print command, and printing control module 44 may determine whether the received print command is for secure printing at Step S101. When the received print command comprises image data, the image data may be stored in image-data-file storage unit 41. When the received print command is not for secure printing, printing control module 44 may determine that the print command may be for normal printing (e.g., Step S101: NO) and may control the operation of printing mechanism 13, so that an image defined by the received image-data file may be printed on a sheet at Step S102. When the print command is for normal printing, the image data ma be printed without being stored in image-data-file storage unit 41.

When printing control module 44 determines that the received print command is for secure printing (e.g., Step S101: YES), then authentication information, which is input to IC card reader 11 or operation panel 12, may be transmitted to server 71 by communication control module 47 via communication unit 48, and authentication determination module 52 of server 71 may determine whether the authentication information received by communication unit 58 comprises certain predetermined information (e.g., whether the authentication information matches information stored in authentication-database storage unit 51) at Step S103. When authentication determination module 52 determines that the input authentication information does not comprise the predetermined information (e.g., Step S103: NO), then information indicating that the input authentication information does not comprise the predetermined information may be transmitted to printer 1 by communication control module 53 via communication unit 58. When that information is received by communication unit 48 of printer 1, UI control module 43 may standby until authentication information again is input to IC card reader 11 or operation panel 12. In that example, UI control module 43 may cause operation panel 12 to display the information indicating that the input authentication information does not comprise the predetermined information.

When authentication determination module 52 of server 71 determines that the input authentication information comprises the predetermined information (e.g., Step S103: YES), the information on portable terminal 73 associated with the authentication information stored in the authentication-database storage unit 51 and the determination result may be transmitted to printer 1 by communication control module 53 via communication unit 58, and the information on portable terminal 73 and the determination result may be received by communication unit 48 of printer 1. UI control module 43 may cause operation panel 12 to display the identification information of image-data files at the public level among the image-data files stored in image-data-file storage unit 41 at Step S104.

When the authentication information is input not to IC card reader 11 but to operation panel 12 in Step S103 (e.g., Step S105: NO), UI control module 43 may extract an image-data file at the private level associated with the authentication information and may cause operation panel 12 to display the specific identification information of the extracted files at Step S110. When the authentication information is input to IC card reader 11 in Step S103 (e.g., Step S105: YES), and, when information on portable terminal 73 associated with the authentication information is received by communication unit 48 of printer 1, mobile-terminal identifying module 42 may determine that portable terminal 73 received the information from a specific user's portable terminal 73 (e.g., Step S106: YES). UI control module 43 then may extract identification information of an image-data file at the private level associated with the authentication information from among the image-data files stored in image-data-file storage unit 41. The extracted specific identification information may be transmitted by communication control module 47 to the particular portable terminal 73 identified by mobile-terminal identifying module 42 via communication unit 48. At Step S107, UI control module 62 may cause touch panel 61 of that particular portable terminal 73 to display a list of specific identification information for the image-data file received from printer 1 via communication unit 68. UI control module 43 then may cause operation panel 12 of printer 1 to display an indication that the extracted specific identification information is being displayed on touch panel 61 of portable terminal 73 (e.g., operation panel 12 of printer 1 may display an alarm) at Step S108.

When mobile-terminal identifying module 42 does not identify the particular portable terminal 73 of the user that corresponds to the authentication information (e.g., Step S106: NO), UI control module 43 then may cause operation panel 12 to display an indication that the particular portable terminal 73 was not identified (e.g., operation panel 12 of printer 1 may display an alarm) at Step S109. UI control module 43 then may cause operation panel 12 to further display a selection screen that prompts a user to provide input that indicates permission to display the extracted specific identification information on operation panel 12. When the input indicates permission to display the extracted specific identification information, UI control module 43 may cause operation panel 12 to display the extracted specific identification information at Step S110.

After operation panel 12 displays the extracted specific identification information, printing system 70 may standby until the user selects identification information from the specific identification information displayed on touch panel 61 or operation panel 12 via, the input Step S111: NO). When selection of specific identification information via the input is complete (e.g., Step S111: YES), printing control module 44 may control the operation of printing mechanism 13, so that an image-data file corresponding to the specific identification information that the user selected on touch panel 61 of portable terminal 73 or operation panel 12 may be accessed, and an image defined by the image-data file may be printed on the sheet at Step S112. When the user selects identification information from the specific identification information displayed on operation panel 12, communication control module 67 may transmit the selected specific identification information to printer 1 via communication unit 68. When the information is received by communication unit 48, printing control module 44 may control the operation of printing mechanism 13 on the basis of a print command.

In the embodiment of printing system 70 depicted in FIGS. 1-3, when portable terminal 73 is identified, the specific identification information of an image-data file at the private level associated with authentication information may be displayed on touch panel 61 of portable terminal 73, but not on operation panel 12 of printer 1, which thereby may prevent another user form viewing the specific identification information. Further, when a particular portable terminal 73 is not identified, a user may be prompted to provide permission before the specific identification information of an image-data file at the private level is displayed on operation panel 12 of printer 1. Therefore, even when a particular user is not carrying IC card 64 portable terminal 73), another user may be prevented from viewing the specific identification information of an image-data the at the private level without the particular user's permission.

By using either IC card reader 11 or operation panel 12 as a device, to which authentication information may be input, the user may provide input to select whether to display the specific identification information of an image-data file at the private level on portable terminal 73. IC card reader 11 allows authentication information to be input more easily.

A preview of the image-data file may be displayed on touch panel 61 of portable terminal 73 to allow a user to ascertain the details of the specific identification information before the image defined by that image-data file is printed. When the specific identification information of an image-data file at the private level associated with authentication information is displayed on touch panel 61 of portable terminal 73, that fact may be displayed on operation panel 12 of printer 1. Accordingly, a user may be notified of the condition that the specific identification information is being displayed on portable terminal 73.

Because the specific identification information of image-data files at the public level that are not associated with authentication information may be displayed on operation panel 12 without being displayed on touch panel 61 of portable terminal 73, low-secrecy identification information may not be transmitted to portable terminal 73, which further simplifies data.

2. Embodiment of FIGS. 1, 4, and 5

Figure 4:
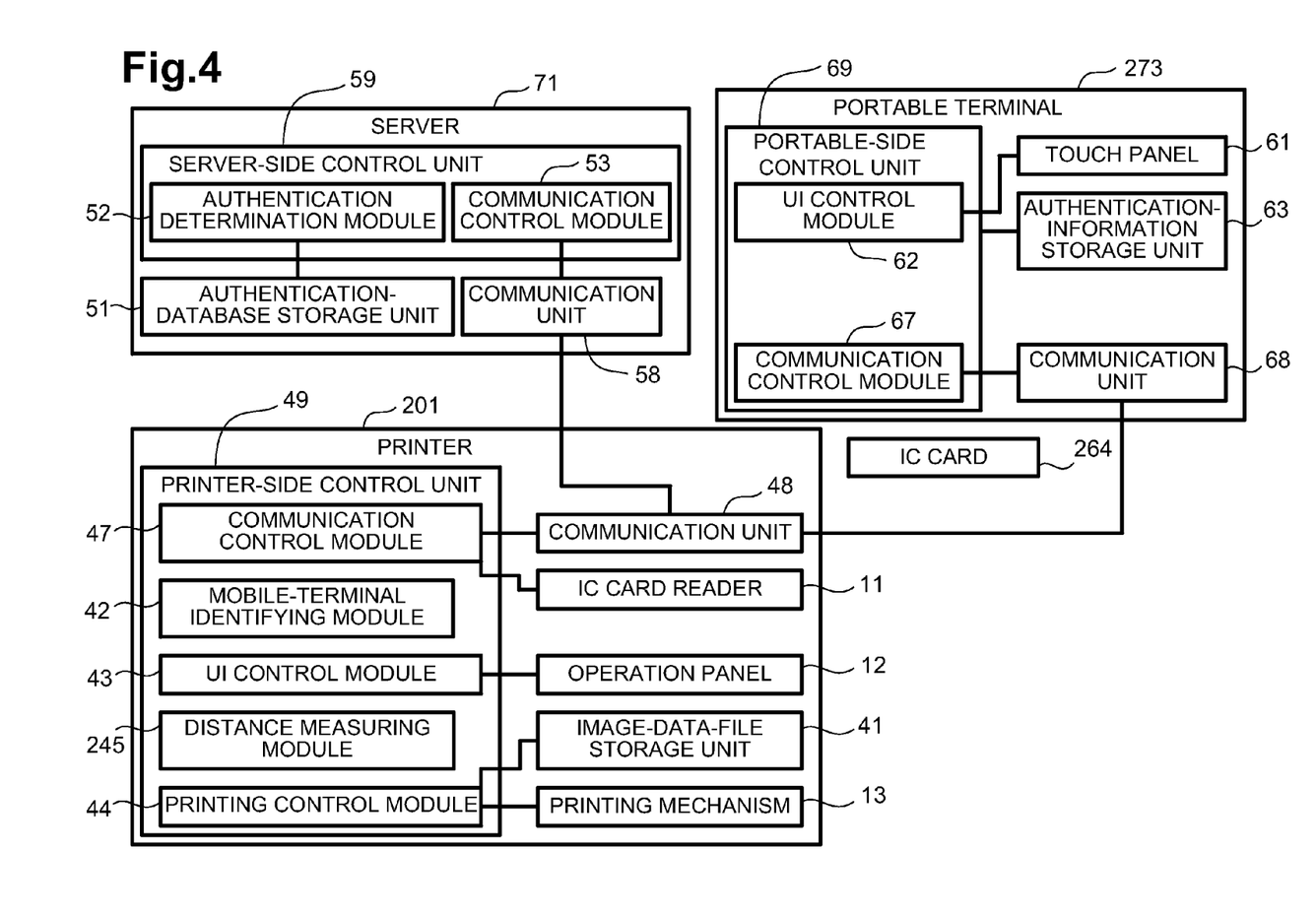
FIG. 4 is a functional, block diagram of a printing system according to another embodiment of the invention.
Figure 5:
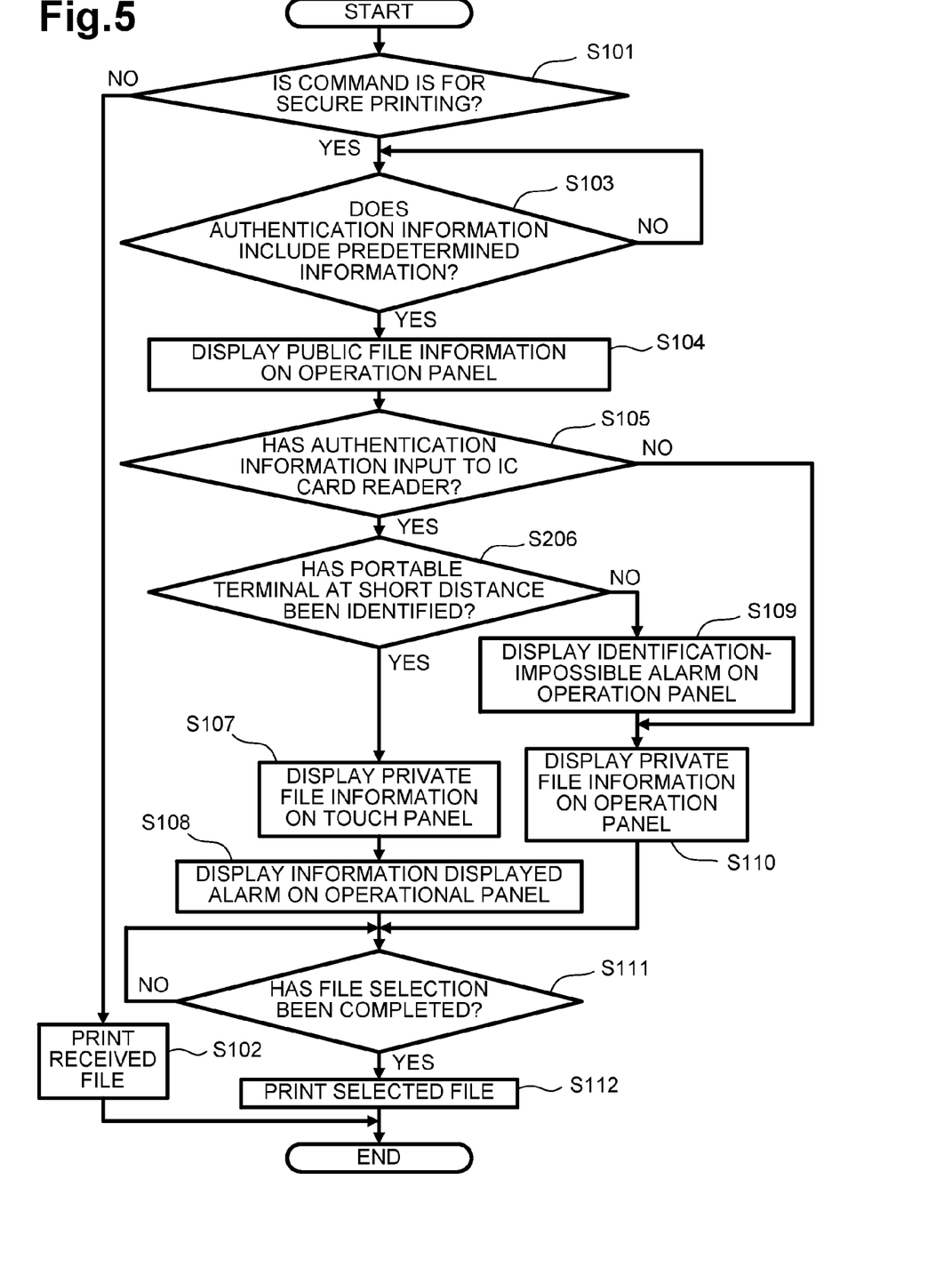
FIG. 5 is a flowchart depicting the operation of the printing system of FIG. 4.

Another embodiment of the present invention is described with respect to FIGS. 1, 4, and 5, wherein the components, functional parts, and steps that are substantially the same as those depicted in FIGS. 1-3 are identified with the same reference characters. Detailed descriptions of those components, functional parts, and steps are omitted here.

In contrast to the printing system 70 depicted in FIG. 2, the printing system 70 depicted in FIG. 4 may be configured, such that IC card 264 is separate from portable terminal 273 and printer 201 further may comprise a distance measuring module 245 (e.g., a distance measuring unit). Accordingly, wireless communication may be performed between IC card reader 11 and IC card 264, when the IC card reader 11 and IC card 264 approach each other.

Distance measuring module 245 may measure the distance between printer 201 and portable terminal 273. That distance may be calculated from the signal strength of wireless communication that may be performed directly between printer 201 and portable terminal 273. When authentication determination module 52 determines that authentication information input to IC card reader 11 comprises predetermined information, mobile terminal identifying module 42 may identify a particular portable terminal 273 of a user that corresponds to the authentication information and for which the distance measured by distance measuring module 245 is less than or equal to a predetermined value (e.g., two meters).

As depicted in FIG. 5, the printing system 70 depicted in FIG. 4 also differs from the printing system 70 depicted in FIG. 2 in that, when authentication information is input to IC card reader 11 Step S105: YES), distance measuring module 245 may determine whether portable terminal 273 is at a sufficiently short distance from printer 201 (e.g., the measured distance is less than or equal to the predetermined value) at Step S206. For example, when mobile-terminal identifying module 42 determines that the information of portable terminal 273 associated with the authentication information is received by communication unit 48 of printer 1, a radio signal for measuring the distance between printer 201 and portable terminal 273 may be transmitted to portable terminal 273 by communication control module 47. When portable terminal 273 receives the radio signal with communication unit 68, portable terminal 273 may transmit a signal wirelessly responding to the radio signal to printer 201 with communication control module 67 via communication unit 68. A predetermined signal strength may be established for the response signal. Accordingly, when the response signal is received by communication unit 48, distance measuring module 245 may measure the distance between printer 201 and portable terminal 273 based on the difference between the strength of the received response signal and the predetermined signal strength, or based on the attenuation of the signal strength. The greater the difference in signal strength, or the greater the attenuation, the greater the distance between printer 201 and portable terminal 273 may be determined by distance measuring module 245. Mobile-terminal identifying module 42 may identify a particular portable terminal 273, for which the distance measured by distance measuring module 245 may be less than or equal to a predetermined value (e.g., two meters). When the distance measured by distance measuring module 245 exceeds the predetermined value (e.g., two meters), mobile-terminal identifying module 42 may not identify the particular portable terminal 273.

In the printing system 70 depicted in FIGS. 1, 4, and 5, when a particular portable terminal 273 is identified, the specific identification information of an image-data file associated with authentication information may be displayed only on touch panel 61 of portable terminal 273, which thereby may prevent another user from viewing the specific identification information. Further, when authentication determination module 52 determines that authentication information input to IC card reader 11 comprises predetermined information, mobile-terminal identifying module 42 may identify the particular portable terminal 273 that corresponds to the authentication information and for which the distance measured by distance measuring module 245 is less than or equal to the predetermined value. Thus, the specific identification information of an image-data file associated with the authentication information is prevented from being displayed on touch panel 61 of portable terminal 273 until the portable terminal 273, which has input authentication information using IC card 264, approaches to within a predetermined distance of printer 201.

3. Embodiment of FIGS. 3 and 6

Figure 6:
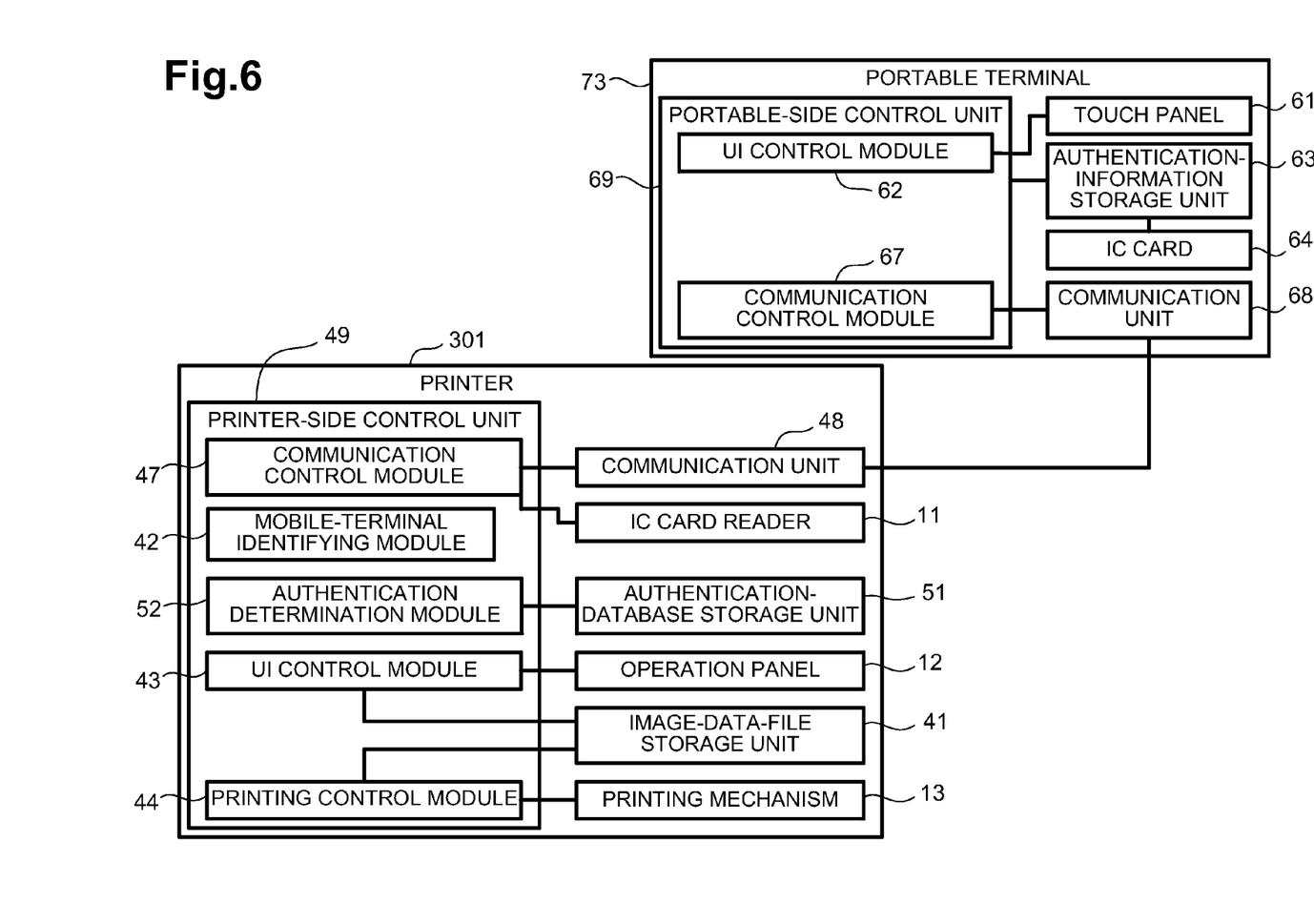
FIG. 6 is a functional, block diagram of a printing system according to another embodiment of the invention.

Another embodiment of the present invention is described with respect to FIG. 6, wherein the components and functional parts that are substantially the same as those depicted in FIG. 2 are identified with the same reference characters. Detailed descriptions of those components and functional parts are omitted here.

In contrast to printing system 70 depicted in FIG. 2, printing system 70 depicted in FIG. 6 may not comprise server 71, and authentication-database storage unit 51 and authentication determination module 52 may be provided in printer 301, rather than in server 71. As depicted in FIG. 6, because authentication-database storage unit 51 and authentication determination module 52 are integrated in printer 301, printing system 70 may be more compact. Otherwise, the operations of the components of printer 301 and portable terminal 73 may be substantially the same as those depicted in FIGS. 1-3.

4. Embodiment of FIGS. 1, 3, and 7

Figure 7:
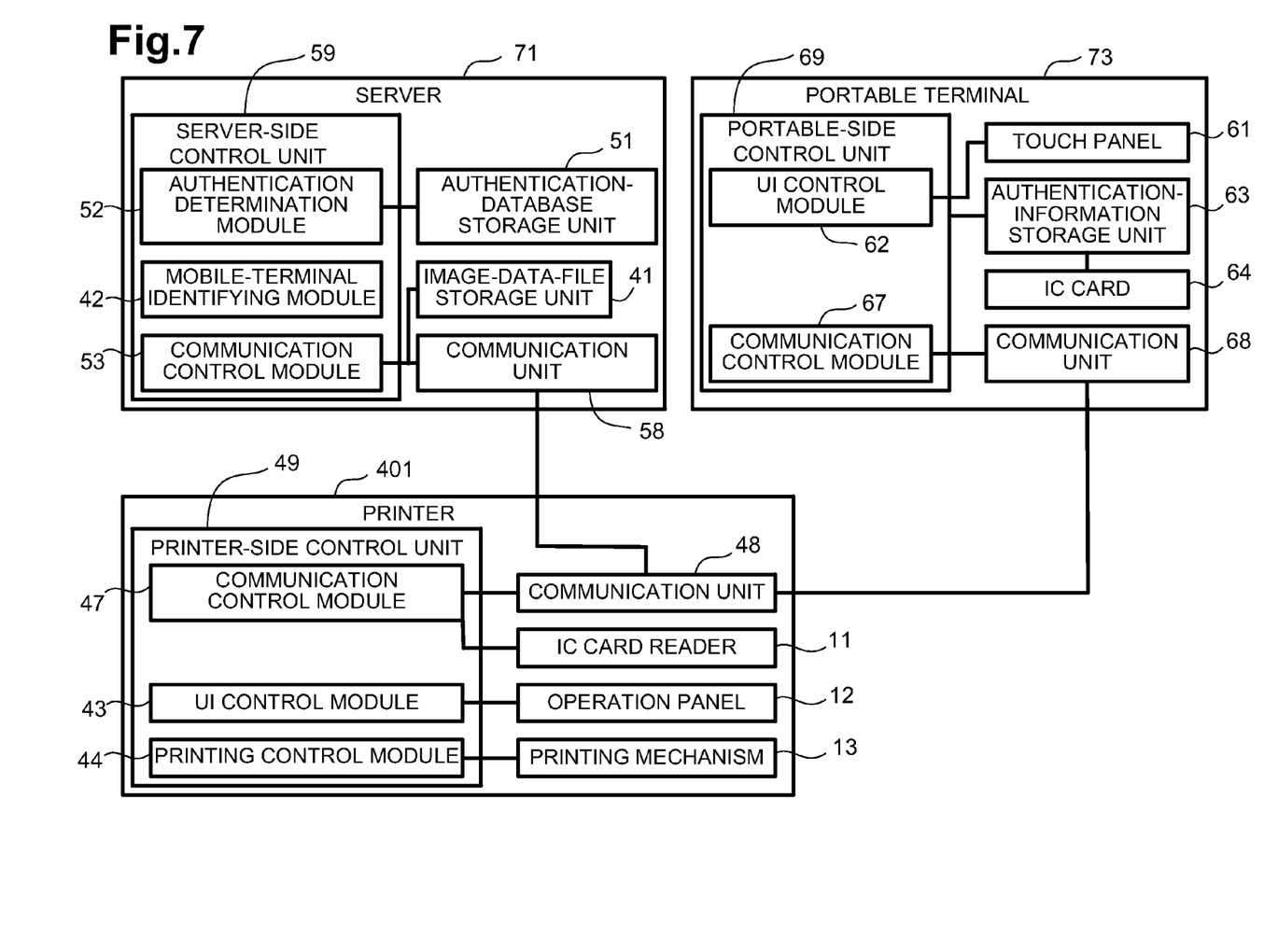
FIG. 7 is a functional, block diagram of a printing system according to another embodiment of the invention.

Another embodiment of the present invention is described with respect to FIG. 7, wherein the components and functional parts that are substantially the same as those depicted in FIG. 2 are identified with the same reference characters. Detailed descriptions of those components and functional parts are omitted here.

In contrast to printing system 70 depicted in FIG. 2, printing system 70 depicted in FIG. 7, image-data-file storage unit 41 and mobile-terminal identifying module 42 may be provided in server 71, rather than in printer 401. In that configuration, data processing may be performed mainly by sever 71, such that communication may be performed between communication unit 58 and communication unit 48 of printer 401 and between communication unit 58 and communication unit 68 of portable terminal 73. Also in that configuration, image-data files and an authentication database may be stored in server 71, such the risk of data leakage may be reduced or omitted. Further, because communication control may be performed primarily by server 71, communication control unit 47 of printer 401 may be less complicated. Moreover, the functional parts of server 71 may be distributed into a plurality of servers.

Although each of the foregoing embodiments may be configured, such that, when portable terminal 73 or 273 is not identified, the specific identification information of an image-data file at the private level associated with the authentication information may be displayed on operation panel 12 after permission is given for such display via operation panel 12, the specific identification information need not be displayed on operation panel 12 at Step S108. Instead, an alarm may be displayed on touch panel 61 at Step S108. The specific identification information also may be displayed on operation panel 12 without a user's permission.

Although each of the foregoing embodiments may be configured, such that the user may use selectively either of IC card reader 11 or operation panel 12, as a device to which authentication information may be input, embodiments of the invention also may be configured, such that only one of IC card reader 11 and operation panel 12 may be used. Alternatively, another input device may be provided. When only operation panel 12 may be used, for example, the determination in Step S105 in FIG. 3 may be omitted, and only Steps S106 and S107 may be performed.

Although each of the foregoing embodiments may be configured, such that a preview of an image-data file may be displayed on touch panel 61, the present invention also may be configured not to display the preview. Further, although each of the foregoing embodiments may be configured, such that, when the specific identification information of an image-data file at the private level associated with the authentication information is displayed on touch panel 61, that configuration may be displayed on operation panel 12, the present invention also may be configured not to display that configuration on operation panel 12.

Although each of the foregoing embodiments may be configured, such that the specific identification information of image-data files at the public level, which may not be associated with the authentication information, may be displayed on operation panel 12, rather than on touch panel 61, the identification information of image-data files at the public level also may be displayed on touch panel 61. In that example, embodiments of the invention may be configured, such that the specific identification information may not be displayed on operation panel 12.

Although each of the foregoing embodiments may be configured, such that image-data-file storage unit 41 may store a database, in which image-data files and authentication information may be associated with each other, a separate storage unit may be provided to store the database.

Although each of the foregoing embodiments may be configured, such that, when information on one portable terminal 73 associated with authentication information is received by communication unit 48, mobile-terminal identifying module 42 may identify another portable terminal 73, the other portable terminal 73 also may be identified by mobile-terminal identifying module 42 after a determination is made as to whether communication with the other portable terminal 73 may be performed. That operation may be performed to determine whether the power of the other portable terminal 73 is OFF, wherein a preliminary signal for determining whether reception is possible may be transmitted to the other portable terminal 73 and the determination may be made based on whether a response to the preliminary signal is received.

The present invention may be applied not only to printers, but also to facsimile machines and copying machines. For example, printers 1 and 201 may have a copying mechanism, wherein an operation screen for the copying mechanism may be displayed on portable terminals 73 and 273, when portable terminals 73 and 273 are a predetermined distance from printer 1 or 201, such that the user may start the operation of the copying mechanism promptly through operations performed at portable terminals 73 and 273. Further, printing mechanism 13 may record by line-type inkjet head(s) or a serial-type inkjet head. In addition, printing mechanism 13 may record by electrophotographic laser head(s).

Server 71; printer 1, 201, 301, or 401; and one or more of PCs 72 may be connected to one another by physical connection (e.g., cable or wire), rather than via the wireless LAN, and connected to portable terminal 73 via the wireless LAN.

While the invention is described above in connection with various example structures and illustrative embodiments, it will be understood by those skilled in the art that other variations and modifications of the structures, configurations, and embodiments described above may be made without departing from the scope of the invention. For example, this application comprises any possible combination of the various elements and features disclosed herein, and the particular elements and features presented in the claims and disclosed above may be combined with each other in other ways within the scope of the application, such that the application should be recognized as also directed to other embodiments comprising other possible combinations. Other structures, configurations, and embodiments will be apparent to those skilled in the art from a consideration of the specification or practice of the invention disclosed herein. It is intended that the specification and the described examples are illustrative with the true scope of the invention being defined by the following claims.

What is claimed is:

1. An image recording system comprising an image recording apparatus and a portable terminal configured to perform data communication with the image recording apparatus, wherein:

the image recording apparatus comprises:
  a memory configured to store image-data files;
  a recording unit configured to record an image defined by at least one of the image-data files on a recording medium;
  an input interface configured to receive input of the authentication information;
  an authentication determination unit configured to determine whether the authentication information comprises predetermined information that corresponds to the portable terminal;
  a portable-terminal identifying unit configured to determine whether the portable terminal is disposed proximate to the image recording apparatus, when the authentication determination unit determines that the authentication information input to the input interface comprises the predetermined information that corresponds to the portable terminal;
  an apparatus-side interface configured to perform data communication with the portable terminal when the portable-terminal identifying unit determines that the portable terminal is disposed proximate to the image recording apparatus;
an apparatus-side communication controller configured to cause the apparatus-side interface to transmit specific identification information to the portable terminal when the portable-terminal identifying unit determines that the portable terminal is disposed proximate to the image recording apparatus, the specific identification information comprising identification information for at least one of the image-data files, among the image-data files in the memory, associated with the authentication information that is determined by the authentication determination unit to comprise the predetermined information;
a display; and
a display controller configured to control the display to prevent the display from displaying the specific identification information when the apparatus-side interface transmits the specific identification information to the portable terminal,
wherein the portable terminal comprises:
  a terminal-side display;
  a terminal-side interface configured to perform data communication with the image recording apparatus; and
  a terminal-side display controller configured to cause the terminal-side display to display the specific identification information, when the terminal-side interface receives the specific identification information.

2. The image recording system according to claim 1, wherein
the image recording apparatus further comprises a distance measuring unit configured to measure a distance between the image recording apparatus and the portable terminal; and
when the authentication determination unit determines that the authentication information input to the input interface comprises the predetermined information, the portable-terminal identifying unit determines that the portable terminal is disposed proximate to the image recording apparatus when the distance measured by the distance measuring unit is less than or equal to a predetermined value.

3. The image recording system according to claim 1, wherein, when the authentication determination unit determines that the authentication information input to the input interface comprises the predetermined information, and the portable-terminal identifying unit determines that the portable terminal is not proximate to the image recording apparatus, the display controller causes the display to display the specific identification information.

4. The image recording system according to claim 1, wherein
the image recording apparatus further comprises a display-permission input interface configured to accept input indicating whether to permit the display to display the specific identification information; and
when the authentication determination unit determines that the authentication information input to the input interface comprises the predetermined information, and the portable-terminal identifying unit determines that the portable terminal is not proximate to the image recording apparatus, the display controller causes the display to display an indication that the portable terminal is not identified and, after permission is input to the display-permission input interface, to display the specific identification information.

5. The image recording system according to claim 1, wherein
the image recording apparatus further comprises a user-authentication input interface configured to receive input of authentication information for users;
the authentication determination unit further is configured to determine whether the authentication information input to the user-authentication input interface comprises the predetermined information; and
when the authentication determination unit determines that the authentication information input to the user-authentication input interface comprises the predetermined information, the display controller causes the display to display the specific identification information stored in the memory.

6. The image recording system according to claim 1, wherein
the portable terminal further comprises an authentication-information memory configured to store the authentication information, and
the input interface is configured to automatically retrieve the authentication information stored in the authentication-information storage.

7. The image recording system according to claim 1, wherein the terminal-side display controller is configured to cause the terminal-side display of the portable terminal to display the specific identification information stored in the storage and, thereafter, to cause the terminal-side display to display a preview of an image defined by the image-data file.

8. The image recording system according to claim 1, wherein, when the terminal-side display controller causes the terminal-side display to display the specific identification information, the display controller causes the display to display an indication that the terminal-side display is displaying the specific identification information.

9. The image recording system according to claim 1, wherein the display controller is configured to cause the display to display, among image-data files stored in the memory, identification information for an image-data file that is not associated with the authentication information.

10. The image recording system according to claim 1, wherein the terminal-side display controller is configured to cause the terminal-side display not to display, among image-data files stored in the storage, identification information of image-data files that are not associated with the authentication information; and the display controller is configured to cause the display to display, among the image-data files stored in the storage, identification information of the image-data files that are not associated with the authentication information.

11. An image recording apparatus configured to perform data communication with a portable terminal, the image recording apparatus comprising:

a memory configured to store image-data files;

a recording unit configured to record an image defined by at least one of the image-data files on a recording medium;

an input interface configured to receive input of authentication information;

an authentication determination unit configured to determine whether the authentication information comprises predetermined information that corresponds to the portable terminal;

a portable-terminal identifying unit configured to determine whether the portable terminal is disposed proximate to the image recording apparatus, when the authentication determination unit determines that the authentication information input to the input interface comprises the predetermined information that corresponds to the portable terminal;

an apparatus-side interface configured to perform data communication with the portable terminal when the portable-terminal identifying unit determines that the portable terminal is disposed proximate to the image recording apparatus;

an apparatus-side communication controller configured to cause the apparatus-side interface to transmit specific identification information to the portable terminal-when the portable-terminal identifying unit determines that the portable terminal is disposed proximate to the image recording apparatus, the specific identification information comprising identification information for at least one of the image-data files, among the image-data files in the memory, associated with the authentication information that is determined by the authentication determination unit to comprise the predetermined information;

a display; and a display controller configured to control the display to prevent the display from displaying the specific identification information when the apparatus-side interface transmits the specific identification information to the portable terminal, wherein the portable terminal comprises:

a terminal-side display;

a terminal-side interface configured to perform data communication with the image recording apparatus; and a terminal-side display controller configured to cause the terminal-side display to display the specific identification information, when the terminal-side interface receives the specific identification information.

* * * * *